United States Patent
Starin et al.

(10) Patent No.: US 12,124,584 B2
(45) Date of Patent: Oct. 22, 2024

(54) SYSTEM AND METHOD FOR DETECTING INSIDER THREATS IN SOURCE CODE

(71) Applicant: Bank of America Corporation, Charlotte, NC (US)

(72) Inventors: Jason Conrad Starin, Huntersville, NC (US); Jack Lawson Bishop, III, Evanston, IL (US)

(73) Assignee: Bank of America Corporation, Charlotte, NC (US)

( * ) Notice: Subject to any disclaimer, the term of this patent is extended or adjusted under 35 U.S.C. 154(b) by 400 days.

(21) Appl. No.: 17/394,758

(22) Filed: Aug. 5, 2021

(65) Prior Publication Data

US 2023/0041068 A1    Feb. 9, 2023

(51) Int. Cl.
G06F 21/57    (2013.01)
G06F 11/36    (2006.01)

(52) U.S. Cl.
CPC ........ G06F 21/577 (2013.01); G06F 11/3664 (2013.01); G06F 2221/033 (2013.01)

(58) Field of Classification Search
CPC ............... G06F 21/577; G06F 11/3664; G06F 2221/033; G06F 21/563; G06F 21/57
See application file for complete search history.

(56) References Cited

U.S. PATENT DOCUMENTS

| | | | |
|---|---|---|---|
| 7,530,105 B2 | 5/2009 | Gilbert et al. |
| 7,730,299 B2 | 6/2010 | Boebert et al. |
| 7,921,289 B2 | 4/2011 | Teijido et al. |
| 8,082,191 B2 | 12/2011 | Omatsu |
| 8,196,207 B2 | 6/2012 | Hill et al. |
| 8,392,997 B2 | 3/2013 | Chen et al. |
| 8,468,244 B2 | 6/2013 | Redlich et al. |
| 8,671,224 B2 | 3/2014 | Bell et al. |
| 8,688,676 B2 | 4/2014 | Rush et al. |
| 8,707,431 B2 | 4/2014 | Stephens et al. |
| 8,726,383 B2 | 5/2014 | Blackwell |
| 8,762,188 B2 | 6/2014 | Abercrombie et al. |
| 8,769,412 B2 | 7/2014 | Gill et al. |
| 8,782,404 B2 | 7/2014 | Lamb |
| 8,782,794 B2 | 7/2014 | Ramcharran |

(Continued)

OTHER PUBLICATIONS

Bishop III, J. L., et al., "System and Method for Identifying Insider Threats in Source Code," U.S. Appl. No. 17/065,426, filed Oct. 7, 2020, 76 pages.

(Continued)

*Primary Examiner* — Joseph P Hirl
*Assistant Examiner* — Thomas A Gyorfi (57) ABSTRACT

A code repository stores source code. An insider threat detection system stores instructions for detecting code defects and criteria indicating predetermined types of code defects that, when present, are associated with intentional obfuscation of one or more functions of the source code. The insider threat detection system receives an entry of source code and detects, using the model, a set of code defects in the entry of source code. A defect type is determined for each code defect, thereby determining a set of defect types included in the entry of source code. If it is determined that each of the predetermined types of code defects indicated by the criteria is included in the determined set of defect types, the entry of source code is determined to include an insider threat.

17 Claims, 3 Drawing Sheets

(56) References Cited

U.S. PATENT DOCUMENTS

| | | |
|---|---|---|
| 8,793,790 B2 | 7/2014 | Khurana et al. |
| 8,844,044 B2 | 9/2014 | Kennedy et al. |
| 8,868,728 B2 | 10/2014 | Margolies et al. |
| 9,043,905 B1 | 5/2015 | Allen et al. |
| 9,306,965 B1 | 4/2016 | Grossman et al. |
| 9,311,586 B2 | 4/2016 | Robinette et al. |
| 9,325,728 B1 | 4/2016 | Kennedy et al. |
| 9,378,242 B1 | 6/2016 | Fontenot et al. |
| 9,424,426 B2 | 8/2016 | Payne et al. |
| 9,449,183 B2 | 9/2016 | Wu |
| 9,473,522 B1 | 10/2016 | Kotler et al. |
| 9,544,321 B2 | 1/2017 | Baikalov et al. |
| 9,628,501 B2 | 4/2017 | Datta Ray et al. |
| 9,641,544 B1 | 5/2017 | Treat et al. |
| 9,697,355 B1 | 7/2017 | Park et al. |
| 9,753,796 B2 | 9/2017 | Mahaffey et al. |
| 9,774,616 B2 | 9/2017 | Flores |
| 9,798,884 B1 * | 10/2017 | Bishop, III ........... G06F 21/566 |
| 9,800,605 B2 | 10/2017 | Baikalov et al. |
| 9,811,556 B2 | 11/2017 | Fontenot et al. |
| 9,934,270 B2 | 4/2018 | Friedman et al. |
| 10,019,677 B2 | 7/2018 | Gill et al. |
| 10,027,711 B2 | 7/2018 | Gill et al. |
| 10,095,734 B2 | 10/2018 | Fontenot et al. |
| 10,122,747 B2 | 11/2018 | Mahaffey et al. |
| 10,382,448 B2 | 8/2019 | Nguyen-Tuong et al. |
| 2015/0047032 A1 | 2/2015 | Hannis et al. |
| 2015/0302198 A1 * | 10/2015 | Payne ................... G06F 21/562 726/23 |
| 2015/0381649 A1 | 12/2015 | Schultz et al. |
| 2016/0065594 A1 | 3/2016 | Srivastava et al. |
| 2016/0078365 A1 | 3/2016 | Baumard |
| 2016/0234236 A1 | 8/2016 | Silva et al. |
| 2016/0306966 A1 | 10/2016 | Srivastava et al. |
| 2017/0251002 A1 * | 8/2017 | Rostamabadi ........ G06F 21/566 |
| 2018/0103052 A1 | 4/2018 | Choudhury et al. |
| 2020/0117446 A1 | 4/2020 | Smith et al. |
| 2020/0137097 A1 | 4/2020 | Zimmermann et al. |
| 2020/0210590 A1 * | 7/2020 | Doyle ....................... G06F 8/77 |
| 2020/0259852 A1 * | 8/2020 | Wolff ..................... H04L 67/10 |
| 2022/0179965 A1 * | 6/2022 | Allen ...................... G06F 21/14 |
| 2023/0308458 A1 * | 9/2023 | Varsanyi ............. H04L 63/1416 726/22 |

OTHER PUBLICATIONS

Bishop III, J. L., et al., "System and Method for Identifying Unpermitted Data in Source Code," U.S. Appl. No. 17/065,324, filed Oct. 7, 2020, 79 pages.

* cited by examiner

SYSTEM AND METHOD FOR DETECTING INSIDER THREATS IN SOURCE CODE

TECHNICAL FIELD

The present disclosure relates generally to information security and vulnerability assessment in source code, and more specifically to a system and method for detecting insider threats in source code.

BACKGROUND

Source code is programming code presented in a human-readable programming language. A given program, or computing task, may be implemented using source code. Developers require specialized training and knowledge of a source code's programming language to understand the function(s) of a given piece of source code and prepare software. In some cases, software can perform undesired functions that can compromise data security through introduction of malicious content by the software developer, resulting in a so-called "insider threat."

SUMMARY

As software systems grow in size and complexity, user demands continue to require shorter development cycles. This trend has led software developers to compromise on functionality, quality, and development time of software products in order to meet those demands. As such, software products often suffer from insufficient testing, poor quality, and therefore security vulnerabilities due to errors of omission (e.g., when information is incorrectly omitted from source code or related software) or commission (e.g., where information is included incorrectly in source code or related software). Because of shorter software development cycles, there may be reduced security review and oversight, resulting in an increased risk of developers embedding insecure or malicious content into software as an error of commission. This disclosure recognizes that, in some cases, security vulnerabilities can be intentionally included by developers in source code. Such intentionally included vulnerabilities may be referred to as insider threats. An insider threat may be intentionally obfuscated or hidden in the source code, such that related security vulnerabilities are not detectable using previous security vulnerability assessment technologies. As such, previous security vulnerability assessment technologies are not able to provide comprehensive security vulnerability assessment for software products, particularly for the identification of intentionally obfuscated insider threats.

Certain embodiments of this disclosure provide unique solutions to technical problems of previous technology, including those described above, by providing the practical application of an insider threat detection system. For example, the disclosed system provides several technical advantages which may include 1) the ability to detect subtle and well-hidden insider threats based at least in part on models developed from repositories of natural language descriptions of software security vulnerabilities; 2) the ability to regularly update and improve these models based on the most up-to-date security vulnerability descriptions in order to continuously improve insider threat detection; and 3) an increased accuracy and reliability of detected insider threats by establishing criteria for the number and types of code defects that must be detected in order to flag code as containing a potential insider threat. As such, this disclosure may improve the function of computer systems used for detecting software security vulnerabilities.

In some embodiments, the systems, methods, and devices described in this disclosure may particularly be integrated into a practical application of an insider threat detection system that accesses stored source code, detects code defects in the source code (e.g., defects associated with an intentional obfuscation of at least a portion of functions performed by the code), and determines whether an insider threat is detected based on the type and/or quantity of code defects. Criteria for determining whether detected code defects correspond to a potential insider threat may be selected to improve reliability and decrease instances of false positive threat detection (e.g., by requiring that defects of multiple distinct types or categories are detected before an insider threat is determined). In some embodiments, the insider threat detection system determines a model for detecting code defects using natural language descriptions of software vulnerabilities (e.g., descriptions developed by software developers and security researchers). In this way, the detection of relevant code defects can be regularly and automatically updated to continuously improve performance of the insider threat detection system. This insider threat detection system improves security vulnerability assessment technologies by providing a comprehensive analysis of security vulnerabilities. Accordingly, the disclosed insider threat detection system provides a practical application of improving the operations of software systems/products/applications by identifying instances of security vulnerabilities in their corresponding source code. This, in turn, leads to an additional practical application of increasing the security of confidential data stored in servers and databases associated with the source code of those software systems. Thus, by improving the security of the confidential data stored in those servers and databases, the operations of those servers and databases may be improved.

In an embodiment, a system includes a code repository with a memory operable to store source code. An insider threat detection system includes a memory operable to store a model with instructions for detecting code defects and criteria indicating predetermined types of code defects that, when present in the source code, are associated with intentional obfuscation of one or more functions of the source code. A processor of the insider threat detection system is communicatively coupled to the memory. The insider threat detection system receives a first entry of source code stored in the code repository and detects, using the model, a first set of code defects in the first entry of source code. A defect type is determined for each code defect of the first set of code defects, thereby determining a set of defect types included in the first entry of source code. The insider threat detection system determines whether each of the predetermined types of code defects is included in the determined set of defect types. After determining that each of the predetermined types of code defects is included in the determined set of defect types, the insider threat detection system determines that the first entry of source code includes an insider threat. A notification is then provided indicating that the first entry of source code includes the insider threat.

Certain embodiments of this disclosure may include some, all, or none of these advantages. These advantages, and other features, will be more clearly understood from the following detailed description taken in conjunction with the accompanying drawings and claims.

BRIEF DESCRIPTION OF THE DRAWINGS

For a more complete understanding of this disclosure, reference is now made to the following brief description.

DETAILED DESCRIPTION

As described above, in some cases, a software security vulnerability in source code may be related to insider threats. For example, an insider threat may be related to a particular individual who has intentionally included one or more security vulnerabilities in source code in an attempt at circumventing various security controls. In another example, an insider threat may be related to an obfuscated malicious code, such that it is out of mainline or mainstream of the operation of the source code and is only triggered or harvested when specific conditions are met, such as a particular input is received by the source code, the source code is executed at a particular location, a particular time is reached, etc. This disclosure provides various systems, methods, and devices for improving vulnerability assessment technologies by detecting insider threats, such as those described above. In at least some embodiments, the disclosed systems, methods, and devices are particularly suited for the detection of subtle insider threats that would go undetected by both previous technologies and individuals reviewing source code for potential threats.

As used in this disclosure, a natural language corresponds to a an established language (e.g., English) used for human-to-human communication. As used in the disclosure, a programming language refers to a formalized text-based language which includes instructions for implementing functions and/or tasks using a computer. Examples of programming languages include C, C++, C #, Python, JAVA, HTML, and the like. These programming languages are provided for example only. This disclosure contemplates the use of any programming language.

Example System for Detecting Insider Threats in Source Code

Figure 1:
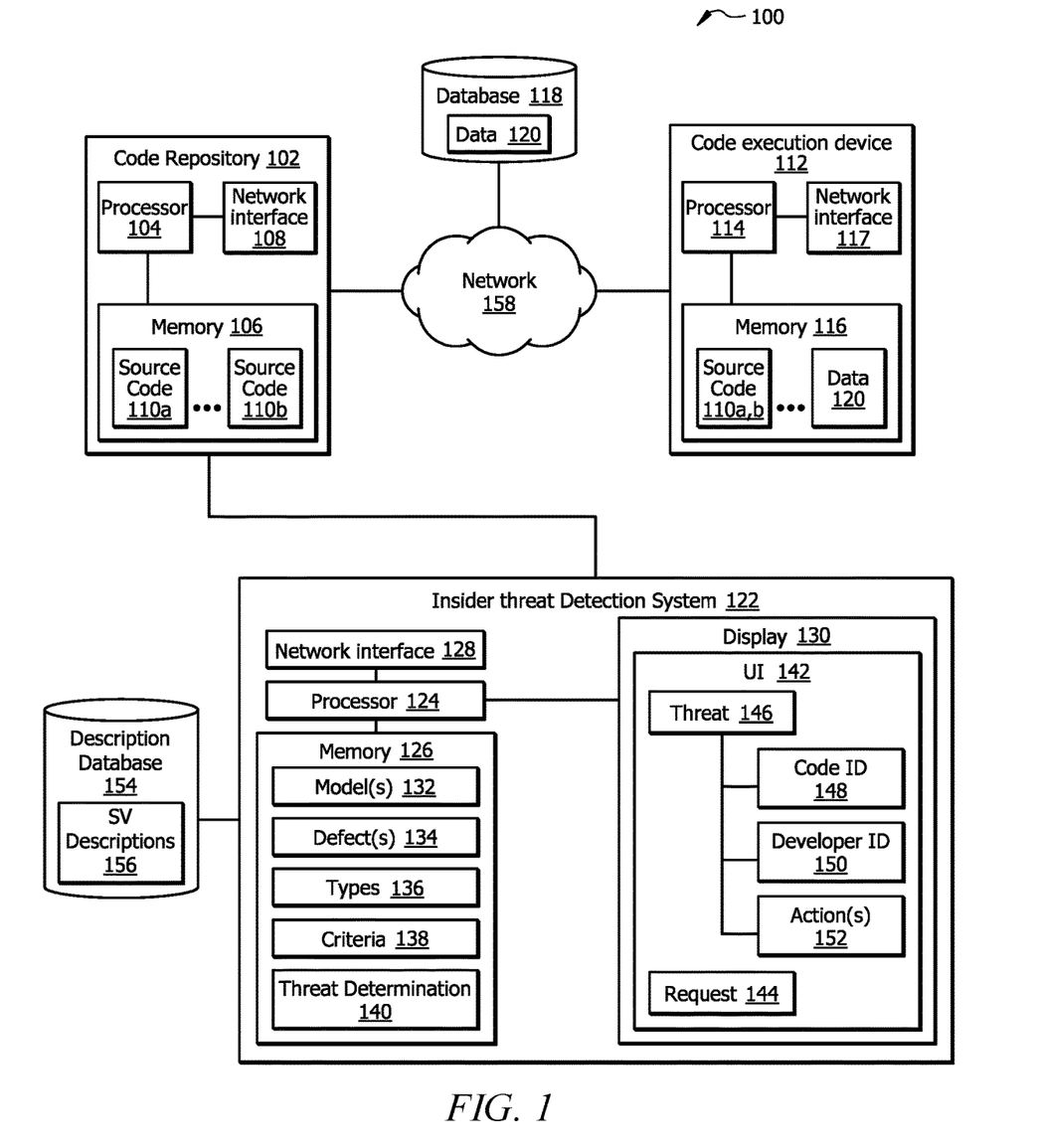
FIG. 1 is a diagram illustrating an example system for improved detection of software security vulnerabilities associated with insider threats.

FIG. 1 is a schematic diagram of an example system 100 for detecting insider threats (e.g., as presented as threat notification 146). The system 100 includes a code repository 102, one or more code execution devices 112, a database 118, an insider threat detection system 122, a security description database 154, and a network 158. As described further below and with respect to FIG. 2, the insider threat detection system 122 of system 100 is generally configured to receive source code 110a,b and automatically make a threat determination 140 regarding whether or not the source code 110a,b includes an insider threat (e.g., the intentional obfuscation of potentially malicious functions in the source code 110a,b). If an insider threat is detected, a threat notification 146 may be presented, for example, in a user interface 142 provided by the insider threat detection system 122. Knowledge of insider threats can be used to proactively prevent access to compromised source code 110a,b by the code execution device(s) 112, thus providing the practical application of improved application and data security.

The code repository 102 is generally a data store, or database, configured to store source code 110a,b. The code repository 102 generally includes a processor 104, memory 106, and network interface 108. The processor 104 of the code repository 102 includes one or more processors. The processor 104 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 104 may be a programmable logic device, a microcontroller, a microprocessor, or any suitable combination of the preceding. The processor 104 is communicatively coupled to and in signal communication with the memory 106 and network interface 108. The one or more processors are configured to process data and may be implemented in hardware and/or software. For example, the processor 104 may be 8-bit, 16-bit, 32-bit, 64-bit or of any other suitable architecture. The processor 104 may include an arithmetic logic unit (ALU) for performing arithmetic and logic operations, processor registers that supply operands to the ALU and store the results of ALU operations, and a control unit that fetches instructions from memory 106 and executes them by directing the coordinated operations of the ALU, registers and other components.

The memory 106 of the code repository 102 is operable to store source code 110a,b and any data, instructions, logic, rules, or code operable to execute the functions of the code repository 102. The memory 106 includes one or more disks, tape drives, or solid-state drives, and may be used as an over-flow data storage device, to store programs when such programs are selected for execution, and to store instructions and data that are read during program execution. The memory 106 may be volatile or non-volatile and may include read-only memory (ROM), random-access memory (RAM), ternary content-addressable memory (TCAM), dynamic random-access memory (DRAM), and static random-access memory (SRAM).

The network interface 108 of the code repository 102 is configured to enable wired and/or wireless communications. The network interface 108 is configured to communicate data between the code repository 102 and other network devices, systems, or domain(s), such as the code execution device(s) 112 and insider threat detection system 122. The network interface 108 is an electronic circuit that is configured to enable communications between devices. For example, the network interface 108 may include one or more serial ports (e.g., USB ports or the like) and/or parallel ports (e.g., any type of multi-pin port) for facilitating this communication. As a further example, the network interface 108 may include a WIFI interface, a local area network (LAN) interface, a wide area network (WAN) interface, a modem, a switch, or a router. The processor 104 is configured to send and receive data using the network interface 108. The network interface 108 may be configured to use any suitable type of communication protocol as would be appreciated by one of ordinary skill in the art. The network interface 108 communicates source code 110a,b to other components of the system 100.

Each entry of source code 110a,b stored in the memory 106 generally includes instructions in a programming language for performing one or more computing tasks. The source code 110a,b may be obtained from a variety of sources and/or prepared by a variety of developers. As an example, a developer at an organization associated with code repository 102 may prepare source code 110a,b for a given project or purpose and store the source code 110a,b in the memory 106 such that it may be used by others (e.g., by code execution device(s) 112). As described elsewhere in this disclosure, the insider threat detection system 122 can review such source code 110a,b in order to make a threat determination 140 regarding whether or not each entry of source code 110a,b may include an insider threat.

A developer may employ a variety of obfuscation methods to conceal an insider threat in the source code 110a,b. As an example scenario, a developer may have written a first entry of source code 110a for a software application. The software application works as intended during most times. However, the developer may hide, in the first source code 110a, a malicious code that remains undetected and unexecuted until the software application receives a rare input that matches predefined rare input criteria. In response to receiving a rare input, the software application associated with source code 110a executes the malicious code. The malicious code may thus be outside of mainline or mainstream of normal operation of the software application associated with source code 110a (i.e., is purposefully layered, e.g., by hiding it within conditional statements, such as "if statements," that get executed only if the rare input is received by the software application). Thus, the developer has successfully hidden their malicious code until a time when the rare input is received by the software application. This scenario is only an example, and insider threats may be introduced through other means.

The code execution device(s) 112 are generally any computing devices operable to receive source code 110a,b and execute the source code 110a,b to perform its corresponding functions. If the source code 110a,b includes an insider threat, such that malicious functions are hidden within the source code 110a,b, the code execution device(s) 112 may inappropriately access data 120, which may be security sensitive or have some malicious intent. For example, data 120 may be stored in a database 118 and not intended to be accessible to users of the code execution devices 112. The database 118 is generally any data store or data repository operable to store data 120. As another example, data 120 may perform further malicious functions and further compromise the security of the code execution device 112. By detecting insider threats, the insider threat detection system 122 can help prevent source code 110a,b with insider threats from reaching code execution devices 112, such that these and other undesirable outcomes are avoided.

Each of the code execution device(s) 112 may be a computer, a mobile device, a personal assistant device, or the like. Each code execution device 112 includes a processor 114, memory 116, and network interface 117. The processor 114 of the code execution device(s) 112 includes one or more processors. The processor 114 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 114 may be a programmable logic device, a microcontroller, a microprocessor, or any suitable combination of the preceding. The processor 114 is communicatively coupled to and in signal communication with the memory 116 and network interface 117. The one or more processors are configured to process data and may be implemented in hardware and/or software. For example, the processor 114 may be 8-bit, 16-bit, 32-bit, 64-bit or of any other suitable architecture. The processor 114 may include an arithmetic logic unit (ALU) for performing arithmetic and logic operations, processor registers that supply operands to the ALU and store the results of ALU operations, and a control unit that fetches instructions from memory 116 and executes them by directing the coordinated operations of the ALU, registers and other components.

The memory 116 of the code execution device(s) 112 is operable to store received source code 110a,b, data 120 accessed via the source code 110a,b, and any data, instructions, logic, rules, or code operable to execute the functions of the code execution device(s) 112. The memory 116 includes one or more disks, tape drives, or solid-state drives, and may be used as an over-flow data storage device, to store programs when such programs are selected for execution, and to store instructions and data that are read during program execution. The memory 116 may be volatile or non-volatile and may include read-only memory (ROM), random-access memory (RAM), ternary content-addressable memory (TCAM), dynamic random-access memory (DRAM), and static random-access memory (SRAM).

The network interface 117 of the code execution device(s) 112 is configured to enable wired and/or wireless communications. The network interface 117 is configured to communicate data between the code execution device(s) 112 and other network devices, systems, or domain(s), such as the code repository 102 and database 118. The network interface 117 is an electronic circuit that is configured to enable communications between devices. For example, the network interface 117 may include one or more serial ports (e.g., USB ports or the like) and/or parallel ports (e.g., any type of multi-pin port) for facilitating this communication. As a further example, the network interface 117 may include a WIFI interface, a local area network (LAN) interface, a wide area network (WAN) interface, a modem, a switch, or a router. The processor 114 is configured to send and receive data using the network interface 117. The network interface 117 may be configured to use any suitable type of communication protocol as would be appreciated by one of ordinary skill in the art. The network interface 117 receives source code 110a,b and data 120.

The insider threat detection system 122 is generally a device or collection of devices operable to receive source code 110a,b and make a threat determination 140 regarding whether or not the source code 110a,b includes an insider threat. A threat notification 146 may be presented, for example, in a user interface 142 provided by the insider threat detection system 122. Knowledge of insider threats can be used to proactively prevent access to compromised source code 110a,b by the code execution device(s) 112. For instance, the insider threat detection system 122 may cause the code repository to automatically restrict access to source code with a positive threat determination 140.

The insider threat determination system 122 includes a processor 124, a memory 126, a network interface 128, and a display 130. The processor 124 of the insider threat determination system 122 includes one or more processors. The processor 124 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 124 may be a programmable logic device, a microcontroller, a microprocessor, or any suitable combination of the preceding. The processor 124 is communicatively coupled to and in signal communication with the memory 126, network interface 128, and display 130. The one or more processors are configured to process data and may be implemented in hardware and/or software. For example, the processor 124 may be 8-bit, 16-bit, 32-bit, 64-bit or of any other suitable architecture. The processor 124 may include an arithmetic logic unit (ALU) for performing arithmetic and logic operations, processor registers that supply operands to the ALU and store the results of ALU operations, and a control unit that fetches instructions from memory 126 and executes them by directing the coordinated operations of the ALU, registers and other components.

The memory 126 of the insider threat determination system 122 is operable to store model(s) 132, the detected defects 134, defect types 136, criteria 138, threat determinations 140, and any data, logic, rules, or code operable to execute the functions of the insider threat determination system 122. The model(s) 132 may include instructions (e.g., defect detection instructions 214 of FIG. 2) for detecting defects 134 in source code 110a,b. The model(s) 132 may be determined and/or updated based at least in part on software vulnerability descriptions 156, as described further below. The defects 134 generally correspond to attributes and/or portions of the source code 110a,b that are related to intentionally obfuscated or hiding functions of the source code 110a,b and/or that may be related to the introduction of malicious functions into the source code 110a,b. Example defects 134 are described in greater detail below with respect to TABLE 1. The defect types 136 correspond to the categories of defects 134 detected in source code 110a,b. The criteria 138 are rules for determining whether defect types 136 of the detected defects 134 indicate that an insider threat is present. For example, the criteria 138 may include comprising predetermined types 136 of code defects 134 that, when present in the source code 110a,b, are associated with intentional obfuscation of one or more functions of the source code 110a,b. The threat determination 140 are generally an indication of whether source code 110a,b includes an insider threat. The memory 126 includes one or more disks, tape drives, or solid-state drives, and may be used as an over-flow data storage device, to store programs when such programs are selected for execution, and to store instructions and data that are read during program execution. The memory 126 may be volatile or non-volatile and may include read-only memory (ROM), random-access memory (RAM), ternary content-addressable memory (TCAM), dynamic random-access memory (DRAM), and static random-access memory (SRAM).

The network interface 128 of the insider threat determination system 122 is configured to enable wired and/or wireless communications. The network interface 128 is configured to communicate data between the insider threat determination system 122 and other network devices, systems, or domain(s), such as the code repository 102. The network interface 128 is an electronic circuit that is configured to enable communications between devices. For example, the network interface 128 may include one or more serial ports (e.g., USB ports or the like) and/or parallel ports (e.g., any type of multi-pin port) for facilitating this communication. As a further example, the network interface 128 may include a WIFI interface, a local area network (LAN) interface, a wide area network (WAN) interface, a modem, a switch, or a router. The processor 124 is configured to send and receive data using the network interface 128.

The network interface 128 may be configured to use any suitable type of communication protocol as would be appreciated by one of ordinary skill in the art. The network interface 128 receives source code 110a,b and software vulnerability descriptions 156.

The display 130 may be any component for displaying information, such as an electronic display. Examples of the display 130 include an LCD screen, an LED display, a plasma display, and the like. The display is communicatively coupled to the processor 124 and configured to present information to a user of the insider threat detection system 122, such as a threat notification 146 and/or corresponding information, such as a code identifier 148, developer identifier 150, and/or action(s) 152, which are described in greater detail below. In some cases, the display 130 may also receive a user input corresponding to a request 144. For example, the display 130 may be a touchscreen.

The insider threat detection system 122 receives an entry of source code 110a,b and detects, using the model(s) 132, a set of code defects 134 (if any) in the entry of source code 110a,b. Examples of code defects 134 include branching logic in the source code 110a,b, code properties appearing in the source code 110a,b corresponding to an attempt to hide operations performed by the source code 110a,b, and third-party ($3^{rd}$ party) code in the source code 110a,b. After the code defects 134 are detected, the insider threat detection system 122 determines a defect type 136 for each detected code defect 134. The code defects 134 may include a hidden functionality of the source code 110a,b, an excessively complex data representation in the source code 110a,b, a portion of irrelevant or non-functional code in the source code 110a,b, and/or the like. TABLE 1 below shows examples of defects 134 of different defect types 136 of code defects 134. The example defect types 136 shown in TABLE 1 include a first type corresponding to the presence of branching logic in the source code 110a,b, a second type corresponding to the presence of code properties indicating an attempt to hide operations performed by the source code 110a,b, and a third type corresponding to the presence of third-party code in the source code 110a,b that is not properly maintained (e.g., that is an outdated or unreliable version).

| Defect Type | Description of example defects of the type |
| --- | --- |
| 1. Branching logic | Omitted break statement in switch<br>Expression is always false<br>Expression is always true |
| 2. Hide invocation | Use of undefined/unspecified/implementation-defined behavior<br>Hidden functionality<br>Excessively complex data representation<br>Excessive code complexity<br>Irrelevant code |
| 3. Opaque $3^{rd}$ party code | Use of unmaintained third party components |

The insider threat detection system 122 determines whether each defect type indicated by the criteria 138 (see FIG. 2 for further illustration) is included in the defect types 136 detected in the source code 110a,b in order to make a threat determination 140 for the source code 110a,b. For example, after determining that the defect types 136 satisfy the criteria 138, the insider threat detection system 122 may determine that the source code 110a,b includes an insider threat (i.e., may make a positive threat determination 140). If a positive threat determination 140 is made, a threat notification 146 may be provided by the insider threat detection system 122. For example, the threat notification 146 may be presented in the user interface 142 of the insider threat detection system 122. In addition to the threat notification 146, the user interface 142 may include further information such as a code identifier 148 identifying the source code 110a,b that includes the insider threat, a developer identifier 150 identifying a developer responsible for creating and/or maintaining the source code 110a,b with the insider threat, and/or action(s) 152 that may be taken to resolve issues associated with the detected insider threat. For example, the actions 152 may indicate whether access to the source code 110a,b with the insider threat should be prevented and/or whether to contact the developer of the source code 110a,b regarding the detected insider threat. In some cases, the threat notification 146 may be presented in response to a request 144 provided via the user interface 142. For example, the user interface 142 may provide a field for receipt of a request 144 for an indication of detected insider threats. Responsive to the request 144, the threat notification 146 and/or the related information 148, 150, 152 may be presented in the user interface 142.

As described further with respect to FIG. 2 below, the model(s) may be determined based at least in part on software vulnerability descriptions 156. For example, the insider threat detection system 122 may receive software vulnerability descriptions 156 that include natural language descriptions of previously determined software vulnerabilities. The software vulnerability descriptions 156 may be obtained from a security description database 154. The security description database 154 may be any appropriate database storing software vulnerability descriptions 156. As an example, the security description database 154 may include information included in the Common Weakness Enumeration (CWE) list provided by MITRE and/or any other appropriate source of software vulnerability descriptions 156. The insider threat detection system 122 then determines, for each received software vulnerability description 156, detectable source code properties and a corresponding defect type and uses this information to determine or update defect detection instructions included in the model(s) 132, as described in greater detail with respect to FIG. 2.

Network 158 facilitates communication between the components of system 100. Network 158 may be any suitable type of wireless and/or wired network including, but not limited to, all or a portion of the Internet, an Intranet, a private network, a public network, a peer-to-peer network, the public switched telephone network, a cellular network, a local area network (LAN), a metropolitan area network (MAN), a wide area network (WAN), and a satellite network. The network 158 may be configured to support any suitable type of communication protocol as would be appreciated by one of ordinary skill in the art.

Figure 2:
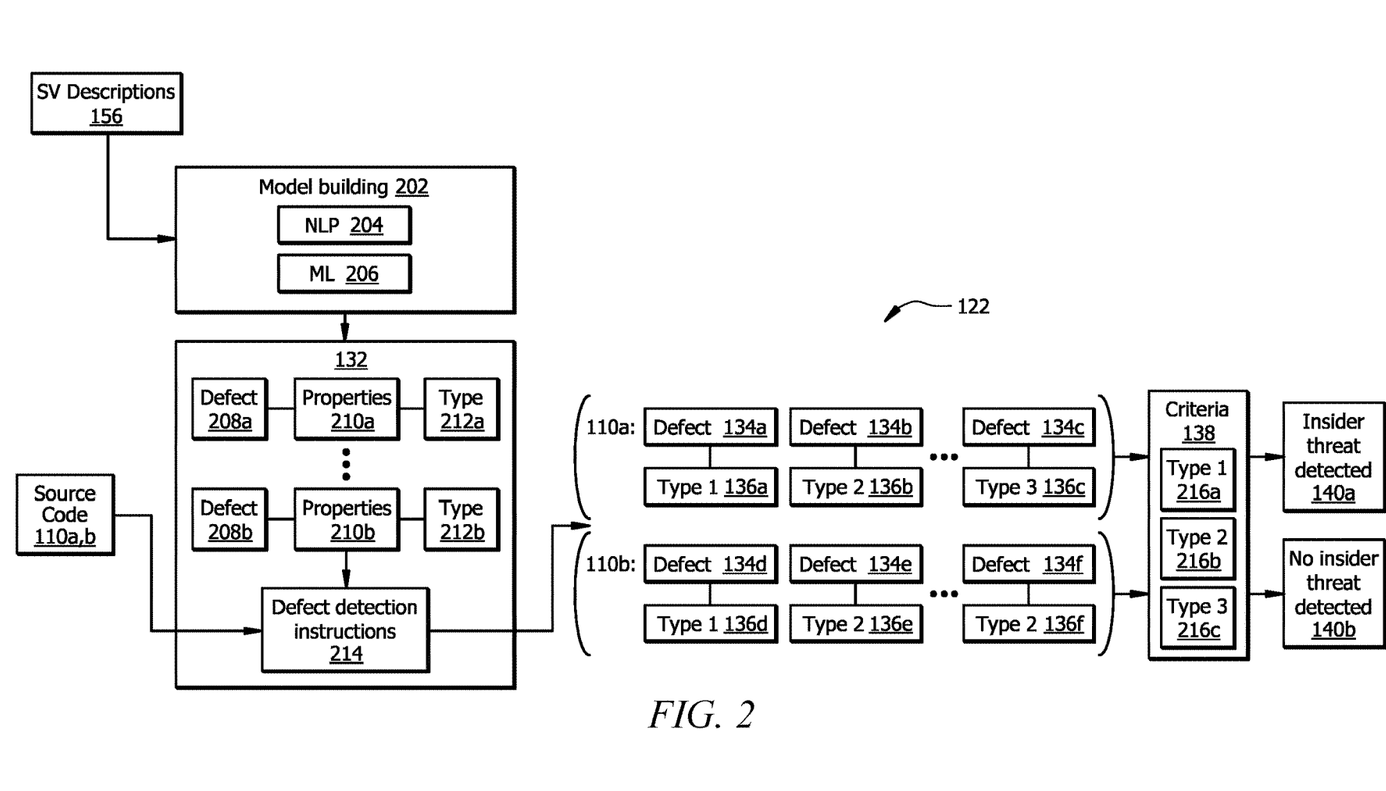
FIG. 2 is a flow diagram illustrating an example operation of the insider threat detection system portion of the system of FIG. 1.

FIG. 2 illustrates an example operation of the insider threat detection system 122 according to an illustrative embodiment. In the example of FIG. 2, the insider threat detection system 122 receives software vulnerability descriptions 156 of previously determined software vulnerabilities. The insider threat detection system 122 uses the software vulnerability descriptions 156 to perform model building 202. Model building 202 may involve the use of natural language processing 204 to transform the natural language software vulnerability descriptions 156 into machine-interpretable information. This information is then processed using a machine learning model 206 to identify for each software vulnerability description 156 a corresponding defect 208a,b. For example, a software vulnerability description 156 of code that includes branching logic, a hide invocation, or opaque $3^{rd}$ party code (see TABLE 1) may be identified as a corresponding defect 208a,b. The machine learning model 206 also determines defect properties 210a,b for each defect 208a,b. The defect properties 210a,b correspond to detectable characteristics of source code 110a,b that can be evaluated to locate the corresponding defect 208a,b (e.g., the presence of particular functional branches, loops, function calls, data calls, etc.). The machine learning model 206 also determines a defect type 212a,b corresponding to the defect 208a,b. The defect type 212a,b may be one of the defect types 136 described with respect to TABLE 1 and FIG. 1 above.

The defect properties 210a,b are used by the insider threat detection system 122 to determine defect detection instructions 214 that are included in the model(s) 132. The defect detection instructions 214 may include any logic, code, or rules for detecting code defects 134 in source code 110a,b. In some cases, the defect detection instructions 214 are a machine learning model trained using the defects 208a,b, defect properties 210a,b, and/or defect types 212a,b to detect code defects 134 in the source code 110a,b.

In this example operation, the insider threat detection system 122 receives a first entry of source code 110a and a second entry of source code 110b. The insider threat detection system 122 uses the defect detection instructions 214 to detect code defects 134a-c in the first entry of source code 110a and corresponding defect types 136a-c for the detected code defects 134a-c. Similarly, insider threat detection system 122 uses the defect detection instructions 214 to detect code defects 134d-f in the second entry of source code 110b and corresponding defect types 136d-f for the detected code defects 134d-f. In this example, defects 134a-c are defect types 136a-c of Type 1, Type 2, and Type 3, while defect types 136d-f of the second entry of source code 110b includes defect types 136d-f of Type 1 and Type 2.

The insider threat detection system 122 then uses criteria 138 to determine whether the first and second entries of source code 110a,b include an insider threat. In this example, the criteria 138 indicate that in order for source code 110a,b to include an insider threat, defects 134 of three different types 216a-c (including Type 1, Type 2, and Type 3) should be present in the source code 110a,b. As an example, the first type 216a (Type 10 indicated in the criteria 138 could be a branching logic type, the second type 216b (Type 2) may be a hide invocation type, and the third type 216c (Type 3) may be an opaque $3^{rd}$ party code type (see TABLE 1). In this example, the first entry of source code 110a includes each of the types 216a-c (i.e., Types 1, 2, and 3) of defects. Accordingly a positive insider threat determination 140a is made for the first entry of source code 110a. Meanwhile, since the second entry of source code 110b does not include each type 216a-c indicated in the criteria 138 (i.e., because Type 3 is missing from source code 110b), a negative insider threat determination 140b is made for source code 110b.

Examples Method of Detecting Insider Threats

Figure 3:
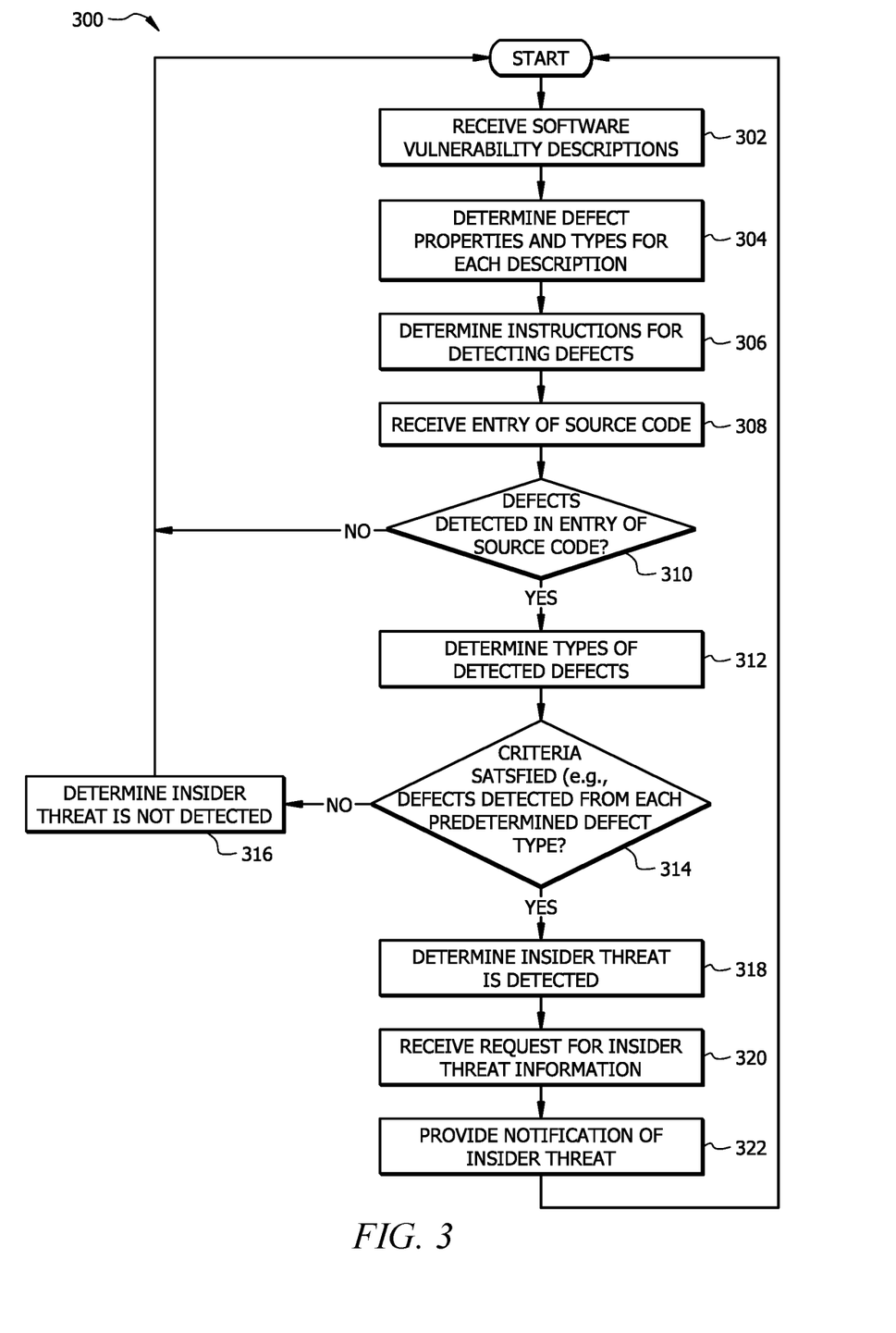
FIG. 3 is a flow chart illustrating an example operation of the system of FIG. 1.

FIG. 3 illustrates an example method 300 of operating the system 100 of FIG. 1. The method 300 may be integrated into the practical application of improving the detection of insider threats based on subtle and previously unrecognized combinations of defects 134 in source code 110a,b. The method 300 may be performed using the processor 124, memory 126, network interface 128, and/or display 130 of the insider threat detection system 122. The method 300 may begin at step 302 where the insider threat detection system 122 receives software vulnerability descriptions 156. The software vulnerability descriptions 156 include natural language descriptions of previously determined software vulnerabilities, as described above.

At step 304, the insider threat detection system 122 determines, based on the software vulnerability descriptions 156, defect properties 210a,b and defect types 212a,b corresponding to code defects 208a,b described in the software vulnerability descriptions 156. For example, the insider threat detection system 122 may perform model building 202 as described with respect to FIG. 2 above. For instance, the insider threat detection system 122 may use natural language processing 204 to transform the natural language software vulnerability descriptions 156 into machine-interpretable information. This information is then processed using a machine learning model 206 to identify for each software vulnerability description 156 a corresponding defect 208a,b.

At step 306, the insider threat detection system 122 determines a model 132 with defect detection instructions 214. For example, insider threat detection system 122 may determine defect properties 210a,b for each defect 208a,b (e.g., using machine learning model 206 of FIG. 2). The defect properties 210a,b may correspond to detectable characteristics of source code 110a,b that can be evaluated to locate the corresponding defect 208a,b. The machine learning model 206 also determines a defect type 212a,b corresponding to the defect 208a,b. The defect properties 210a,b and defect types 212a,b are used by the insider threat detection system 122 to determine defect detection instructions 214 that are included in the model(s) 132. For example, a machine learning model corresponding to the defect detection instructions 214 may be trained using the defect properties 210a,b and defect types 212a,b.

At step 308, the insider threat detection system 122 receives an entry of source code 110a,b. For example, the insider threat detection system 122 may send a request for source code 110a,b and, responsive to the request, receive the source code 110a,b. In some cases, the source code 110a,b may be automatically accessed or received intermittently (e.g., based on a schedule, a user request 144, or the like).

At step 310, the insider threat detection system 122 determines whether code defects 134 are detected in the source code 110a,b using the defect detection instructions 214 from step 306. For example, if the defect detection instructions 214 corresponds to a machine learning model, the source code 110a,b may be provided as an input to the machine learning model, and any detected defects 134 may be generated as an output of the machine learning model. If a code defect 134 is not detected, the insider threat detection system 122 may return to the start of the method 300, for example, to receive any newly available software vulnerability descriptions 156 and update the defect detection instructions 214. If a code defect 134 is detected at step 310, the insider threat detection system 122 proceeds to step 312.

At step 312, the insider threat detection system 122 determines defect types 136 of the code defects 134 detected at step 310. For example, the defect detection instructions 214 may be used to determine the defect types 136 of detected code defects 134, as described with respect to FIGS. 1 and 2 above. For example, in the example of FIG. 2, the first entry of source code 110a is determined to have defect types 136a-c, and the second entry of source code 110b is determined to have defect types 136d-f.

At step 314, the insider threat detection system 122 determines whether the defect types 136 satisfy the criteria 138 that indicate defect types 216a-c that, when present in source code 110a,b, are associated with intentional obfuscation of one or more functions of the source code 110a,b. For example, the insider threat detection system 122 may determine whether the detected code defects 134 include all of the defect types 216a-c indicated by the criteria 138. If the criteria 138 are satisfied at step 316, the insider threat detection system 122 proceeds to step 318 and determines that an insider threat is detected. However, if the insider threat detection system 122 determines that the criteria 138 are not satisfied, the insider threat detection system 122 proceeds to step 316 and determines that an insider threat is not detected. For example, in the example of FIG. 2, the first entry of source code 110a satisfies the criteria 138 by having defects 134a-c with defect types 136a-c that include all of the defect types 216a-c indicated by the criteria 138, and a positive threat determination 140a is determined. Meanwhile, still referring to the example of FIG. 2, the second entry of source code 110b does not satisfy the criteria 138, and a negative threat determination 140b is determined.

Referring again to method 300 of FIG. 3, at step 320, the insider threat detection system 122 may receive a request 144 for information regarding insider threats in stored source code 110a,b, as described in greater detail with respect to FIG. 1 above. For example, the user interface 142 may provide a field for receipt of the request 144 for an indication of detected insider threats, and a request 144 may be provided in this field. At step 322, the insider threat detection system 122 provides a threat notification 146 and/or the related information 148, 150, 152 described with respect to FIG. 1 above. For instance, in addition to the threat notification 146 (or as part of the threat notification 146), the insider threat detection system 122 may present one or more of a code identifier 148 identifying the source code 110a,b that includes the insider threat, a developer identifier 150 identifying a developer responsible for creating and/or maintaining the source code 110a,b with the insider threat, and/or one or more actions 152 that may be taken to resolve issues associated with the detected insider threat (e.g., disabling access to the source code 110a,b).

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated into another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112 (f) as it exists on the date of filing hereof unless the words "means for" or "step for" are explicitly used in the particular claim.

The invention claimed is:

1. A system, comprising:
a code repository comprising a memory operable to store source code, each entry of the stored source code comprising instructions in a programming language for performing one or more computing tasks; and
an insider threat detection system comprising:
   a memory operable to store:
      a machine-learning model comprising instructions configured to detect code defects in the source code; and
      criteria comprising predetermined types of code defects that, when present, are associated with intentional obfuscation of one or more functions of the source code; and
   a processor communicatively coupled to the memory and configured to:
      receive a first entry of the source code stored in the code repository;
      detect, using the machine-learning model, a first set of code defects in the first entry of the source code;
      determine a defect type for each code defect of the first set of code defects, thereby determining a set of defect types included in the first entry of the source code;
      determine that each of the predetermined types of code defects is included in the determined set of defect types;
      after determining that each of the predetermined types of code defects of the criteria is included in the determined set of defect types, determine that the first entry of the source code includes an insider threat;
      provide a notification indicating that the first entry of the source code includes the insider threat;
      provide a code identifier identifying the source code that includes the insider threat;
      provide a developer identifier identifying a developer responsible for creating and/or maintaining the source code with the insider threat; and
      provide one or more actions to be taken to resolve issues associated with the insider threat, wherein the processor is further configured to determine the machine-learning model by:
         receiving software vulnerability descriptions comprising natural language descriptions of previously determined software vulnerabilities;
         using the software vulnerability descriptions to transform the natural language software vulnerability descriptions into machine-interpretable information; and
         processing the machine-interpretable information to identify for each software vulnerability description a corresponding defect, determine defect properties for each identified defect, and determine a defect type corresponding to the identified defect;
         wherein the defect properties correspond to characteristics of the source code that indicate a location of the defect in the source code; and
         wherein the processor is further configured to use the defect properties and the defect types to train the machine-learning model.

2. The system of claim 1, wherein the code defects comprise one or more of branching logic in the source code, code properties of the source code corresponding to an attempt to hide operations performed by the source code, and a presence of third-party code in the source code.

3. The system of claim 1, wherein the code defects comprise one or more of a hidden functionality of the source code, an excessively complex data representation in the source code, and a portion of irrelevant or non-functional code in the source code.

4. The system of claim 1, wherein the predetermined types of code defects comprise a first type corresponding to a presence of branching logic in the source code, a second type corresponding to a presence of code properties indicating an attempt to hide operations performed by the source code, and a third type corresponding to a presence of third-party code in the source code.

5. The system of claim 1, wherein the processor is further configured to:
   present a user interface;
   receive a request, via the user interface, for an indication of insider threats; and
   present, in the user interface, the notification indicating that the first entry of the source code includes the insider threat, in response to the received request.

6. The system of claim 1, wherein the processor is further configured to:
   receive a second entry of the source code;
   detect, using the machine-learning model, a second set of code defects in the second entry of the source code;
   determine a defect type for each code defect of the second set of code defects, thereby determining a second set of defect types included in the second entry of the source code;
   determine that each of the predetermined types of code defects of the criteria is not included in the second set of defect types; and
   in response to determining that each of the predetermined types of code defects is not included in the second set of defect types, determine that the second entry of the source code does not include an insider threat.

7. A method, comprising:
storing:
   a machine-learning model comprising instructions configured to detect code defects in source code; and
   criteria comprising predetermined types of code defects that, when present, are associated with intentional obfuscation of one or more functions of the source code;
detecting, using the machine-learning model, a first set of code defects in a first entry of the source code;
determining a defect type for each code defect of the first set of code defects, thereby determining a set of defect types included in the first entry of the source code;
determining that each of the predetermined types of code defects is included in the determined set of defect types;
after determining that each of the predetermined types of code defects of the criteria is included in the determined set of defect types, determining that the first entry of the source code includes an insider threat;
providing a notification indicating that the first entry of the source code includes the insider threat;
providing a code identifier identifying the source code that includes the insider threat;
providing a developer identifier identifying a developer responsible for creating and/or maintaining the source code with the insider threat; and providing one or more actions to be taken to resolve issues associated with the insider threat, wherein the method further comprises determining the machine-learning model by:

receiving software vulnerability descriptions comprising natural language descriptions of previously determined software vulnerabilities;

using the software vulnerability descriptions to transform the natural language software vulnerability descriptions into machine-interpretable information; and processing the machine-interpretable information to identify for each software vulnerability description a corresponding defect, determine defect properties for each identified defect, and determine a defect type corresponding to the identified defect;

wherein the defect properties correspond to characteristics of the source code that indicate a location of the defect in the source code; and wherein the processor is further configured to use the defect properties and the defect types to train the machine-learning model.

8. The method of claim 7, wherein the code defects comprise one or more of branching logic in the source code, code properties of the source code corresponding to an attempt to hide operations performed by the source code, and a presence of third-party code in the source code.

9. The method of claim 7, wherein the code defects comprise one or more of a hidden functionality of the source code, an excessively complex data representation in the source code, and a portion of irrelevant or non-functional code in the source code.

10. The method of claim 7, wherein the predetermined types of code defects comprise a first type corresponding to a presence of branching logic in the source code, a second type corresponding to a presence of code properties indicating an attempt to hide operations performed by the source code, and a third type corresponding to a presence of third-party code in the source code.

11. The method of claim 7, further comprising:
presenting a user interface;
receiving a request, via the user interface, for an indication of insider threats; and
presenting, in the user interface, the notification indicating that the first entry of the source code includes the insider threat, in response to the received request.

12. The method of claim 7, further comprising:
receiving a second entry of the source code;
detecting, using the machine-learning model, a second set of code defects in the second entry of the source code;
determining a defect type for each code defect of the second set of code defects, thereby determining a second set of defect types included in the second entry of the source code;
determining that each of the predetermined types of code defects of the criteria is not included in the second set of defect types; and
in response to determining that each of the predetermined types of code defects is not included in the second set of defect types, determining that the second entry of the source code does not include an insider threat.

13. A system, comprising:
a memory operable to store:
a machine-learning model comprising instructions configured to detect code defects in source code; and
criteria comprising predetermined types of code defects that, when present, are associated with intentional obfuscation of one or more functions of the source code; and a processor communicatively coupled to the memory and configured to:
receive a first entry of the source code;
detect, using the machine-learning model, a first set of code defects in the first entry of the source code;
determine a defect type for each code defect of the first set of code defects, thereby determining a set of defect types included in the first entry of the source code;
determine that each of the predetermined types of code defects is included in the determined set of defect types;
after determining that each of the predetermined types of code defects of the criteria is included in the determined set of defect types, determine that the first entry of the source code includes an insider threat;
provide a notification indicating that the first entry of the source code includes the insider threat;
provide a code identifier identifying the source code that includes the insider threat;
provide a developer identifier identifying a developer responsible for creating and/or maintaining the source code with the insider threat; and
provide one or more action to be taken to resolve issues associated with the insider threat, wherein the processor is further configured to determine the machine-learning model by:
receiving software vulnerability descriptions comprising natural language descriptions of previously determined software vulnerabilities;
using the software vulnerability descriptions to transform the natural language software vulnerability descriptions into machine-interpretable information; and
processing the machine-interpretable information to identify for each software vulnerability description a corresponding defect, determine defect properties for each identified defect, and determine a defect type corresponding to the identified defect;
wherein the defect properties correspond to characteristics of the source code that indicate a location of the defect in the source code; and
wherein the processor is further configured to use the defect properties and the defect types to train the machine-learning model.

14. The system of claim 13, wherein the code defects comprise one or more of branching logic in the source code, code properties of the source code corresponding to an attempt to hide operations performed by the source code, a presence of third-party code in the source code, a hidden functionality of the source code, an excessively complex data representation in the source code, and a portion of irrelevant or non-functional code in the source code.

15. The system of claim 13, wherein the predetermined types of code defects comprise a first type corresponding to a presence of branching logic in the source code, a second type corresponding to a presence of code properties indicating an attempt to hide operations performed by the source code, and a third type corresponding to a presence of third-party code in the source code.

16. The system of claim 13, wherein the processor is further configured to:
- present a user interface;
- receive a request, via the user interface, for an indication of insider threats; and
- present, in the user interface, the notification indicating that the first entry of the source code includes the insider threat, in response to the received request.

17. The system of claim 13, wherein the processor is further configured to:
- receive a second entry of the source code;
- detect, using the machine-learning model, a second set of code defects in the second entry of the source code;
- determine a defect type for each code defect of the second set of code defects, thereby determining a second set of defect types included in the second entry of the source code;
- determine that each of the predetermined types of code defects of the criteria is not included in the second set of defect types; and
- in response to determining that each of the predetermined types of code defects is not included in the second set of defect types, determine that the second entry of the source code does not include an insider threat.

* * * * *